United States Patent
Iwasaki et al.

(10) Patent No.: US 6,534,203 B2
(45) Date of Patent: *Mar. 18, 2003

(54) MAGNETIC RECORDING MEDIUM

(75) Inventors: Yoh Iwasaki, Kanagawa (JP); Minoru Ikarashi, Kanagawa (JP); Masafumi Takiguchi, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/275,974

(22) Filed: Mar. 25, 1999

(65) Prior Publication Data

US 2001/0051288 A1 Dec. 13, 2001

(30) Foreign Application Priority Data

Apr. 2, 1998 (JP) .............................. 10-090243

(51) Int. Cl.[7] .............................. G11B 5/66; G11B 5/70
(52) U.S. Cl. .............................. 428/694 T; 428/694 TS; 428/336; 428/900
(58) Field of Search ............... 428/65.3, 336, 428/694 T, 694 TS, 900; 360/113, 126

(56) References Cited

U.S. PATENT DOCUMENTS

| | | | |
|---|---|---|---|
| 5,307,223 A | * 4/1994 | Doerner et al. | 360/97.01 |
| 5,701,222 A | * 12/1997 | Gill et al. | 360/113 |
| 5,815,342 A | * 9/1998 | Akiyama et al. | 360/97.01 |
| 5,942,342 A | * 8/1999 | Hikosaka et al. | 428/694 R |
| 6,020,060 A | * 2/2000 | Yoshida et al. | 428/332 |

FOREIGN PATENT DOCUMENTS

JP 10-289434 * 10/1998

* cited by examiner

Primary Examiner—Holly C. Rickman
(74) Attorney, Agent, or Firm—Sonnenschein, Nath & Rosenthal (57) ABSTRACT

A magnetic recording medium includes an anti-ferromagnetic layer 2 layered on at least one of the opposite major surfaces in a direction along the thickness of a ferromagnetic recording layer 3. It is possible for magnetization in the vicinity of a surface of an anti-ferromagnetic layer 2 facing a ferromagnetic recording layer 3 to be rotated simultaneously with rotation of magnetization of the ferromagnetic recording layer 3. It is also possible for the intensity of exchange coupling between the two layers to be larger than the total magnetic anisotropy of the anti-ferromagnetic layer 2. It is similarly possible for the intensity of the exchange coupling between the two layers to be smaller than the total magnetic anisotropy of the anti-ferromagnetic layer 2 and larger than the magnetic domain energy of the anti-ferromagnetic layer 2. By the above constitution, it is possible to realize a high energy of magnetic anisotropy of the particles of the magnetic material to raise the coercivity to cope with higher recording density expected in near future.

22 Claims, 5 Drawing Sheets

MAGNETIC RECORDING MEDIUM

RELATED APPLICATION DATA

The present application claims priority to Japanese Application No. P10-090243 filed Apr. 2, 1998 which application is incorporated herein by reference to the extent permitted by law.

BACKGROUND OF THE INVENTION

1. Field of the Invention

This invention relates to a magnetic recording medium having a ferromagnetic recording layer on its substrate. More particularly, it relates to a magnetic recording medium, comprised of a ferromagnetic recording layer and an antiferromagnetic recording layer, layered together, to enable recording to a higher recording density.

2. Description of the Related Art

As a recording medium for e.g., a computer, a random-accessible magnetic disc is extensively used. Of these magnetic discs, a magnetic disc employing a substrate of a hard material, such as a glass plate, plastic plate, Ni—P plated Al alloy plate or an almite-processed Al alloy plate, or a so-called hard disc, is now in widespread use because it is superior in response characteristics and suited for high-density recording. In this magnetic disc, at least a recording layer of a ferromagnetic material is formed on a major surface of the substrate.

Meanwhile, for the magnetic recording medium, such as the above-mentioned hard disc, a higher recording density is required, such that there is raised a demand for a reduced thickness of the recording layer and for finer magnetically independent particles of the ferromagnetic material of the recording layer.

That is, from the viewpoint of reducing the counter magnetic field from the recording medium, summed to the magnetic field of the magnetic head during recording, a thinner thickness of the recording layer is desirable. Also, in longitudinal recording in which the direction of magnetization is along the length in the medium plane, a thinner thickness of the recording layer is similarly desirable for alleviating the phenomenon of demagnetization due to the same N or S poles of the recording pits facing each other. Also, in order for a transition area between recording areas of different directions of magnetization not to serve as a magnetic wall presenting moderate change in the direction of magnetization, it is desirable for the particles of the ferromagnetic material to be fine and free from magnetic coupling therebetween.

However, if the grain size of the ferromagnetic material is finer, it becomes impossible for a magnetic recording medium to maintain the recording in stability for prolonged time. The reason is that, if the ferromagnetic grains are comminuted, the energy of magnetic anisotropy for the entire volume of a sole ferromagnetic particle is reduced so that the 'potential mountain' which stabilizes the direction of magnetization can be easily traversed by the magnetization vector due to thermal fluctuations. The phenomenon in which comminuted magnetic particles cannot maintain the constant direction of magnetization due to outstanding thermal fluctuation is termed super-paramagnetism, while the limit of the magnetic recording density thus imposed is termed the limit of the super-paramagnetism.

For achieving high recording density, it is necessary to thrust this limit of the super-paramagnetism towards the high recording density side. To this end, the energy of magnetic anisotropy needs to be increased. Thus, such a material having a high energy of magnetic anisotropy, specifically, such a material presenting various sorts of high anisotropic ions, crystal structure, crystal orientation, crystal grain boundary or precipitates, either alone or in combination, are being developed.

However, if the usefulness of the magnetic material constituting the recording layer of the magnetic recording medium is taken into consideration, not only the energy of magnetic anisotropy but also various other properties, such as corrosion resistance, smoothness, abrasion resistance or ease of manufacture, are required of the magnetic material. As for ease of manufacture, it is required that the magnetic material can be manufactured at a lower process temperature. It is extremely difficult to satisfy the energy of magnetic anisotropy and the above-mentioned various other properties simultaneously and satisfactorily.

Figure 1:
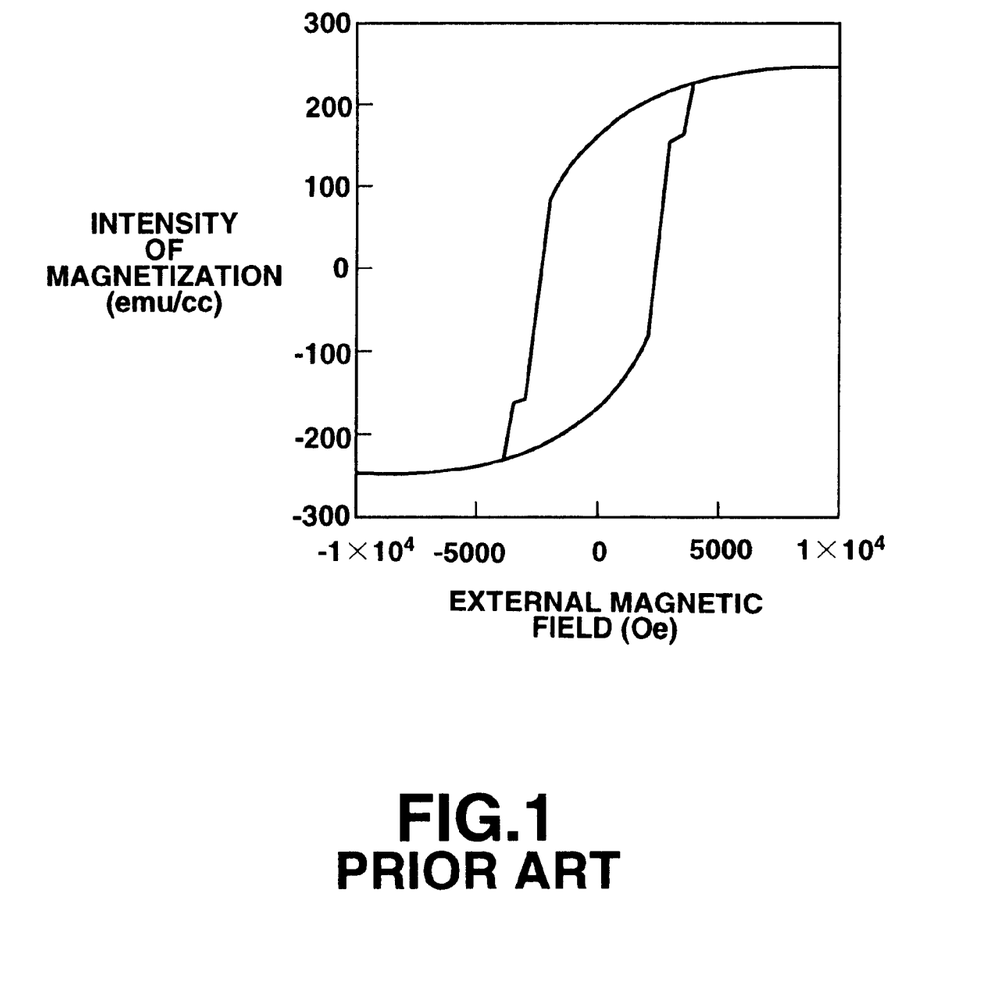
FIG. 1 is a graph showing the typical relation between the external magnetic field and the intensity of magnetization.

An instance of a magnetization curve of the magnetic recording medium is shown in FIG. 1, in which the abscissa and the ordinate denote an external magnetic field and the intensity of magnetization, respectively. In such magnetic recording medium, the coercivity is not larger as a principle than one-half the anisotropic magnetic field. In the instance of FIG. 1, in which the anisotropic magnetic field is 5 kOe, the coercivity cannot exceed 2.5 kOe.

Since the upper limit of the coercivity is regulated by the magnitude of the anisotropic magnetic field, it is necessary to increase the energy of magnetic anisotropy of the magnetic material and the anisotropic magnetic field, if it is desired to increase the coercivity to assure recording stability of the magnetic recording medium.

Figure 2:
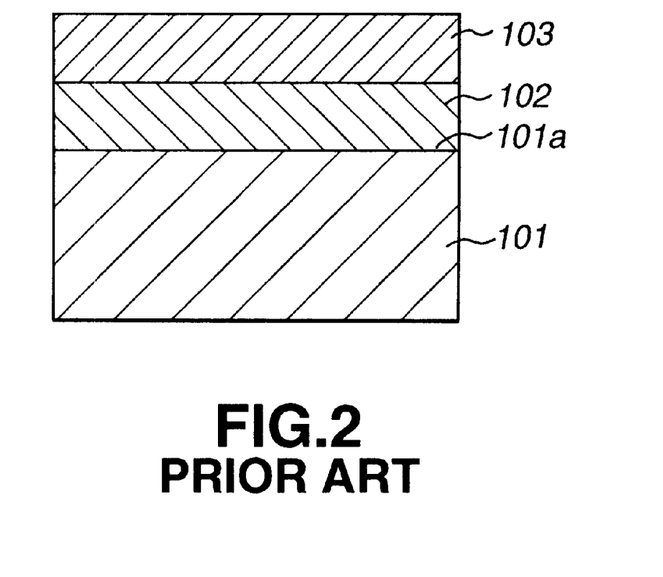
FIG. 2 is a cross-sectional view showing an illustrative structure of a conventional magnetic recording medium.

As a method for increasing the energy of magnetic anisotropy of the particles of the magnetic material to increase the coercivity, there may be recited a method known as 'pinning by a different sort of a magnetic material'. Here, a structure comprised of two magnetic layers of different sorts is taken as an example for illustration. That is, an illustrative structure is now explained, in which a pinning layer 102, as a thin film of a first ferromagnetic material, is formed on a major surface 101a of a substrate 101, and a recording layer 103, as a second thin film of a ferromagnetic material, is formed thereon, as shown in FIG. 2.

It is assumed that the pinning layer 102 meets two requirements, that is, it is high in magnetic anisotropy and low in saturation magnetic flux density in comparison with the recording layer 103.

When two sorts of the magnetic material are in contact with each other, the magnetic moments of the two tend to be parallel or anti-parallel. Thus, the magnetization of these two layers tend to be rotated in unison on both sides of the interface between the pinning layer 102 and the recording layer 103.

If it is presupposed that the magnetization of the two materials is turned in unison parallel to each other, the coercivity is derived in the following manner:

It is assumed that the recording layer 103 has a thickness $t_1$ [m], saturation magnetization $ms_1$[T] and uniaxial magnetic anisotropy $ku_1$ [J/m$^3$], the pinning layer 102 has a thickness $t_2$ [m], saturation magnetization $Ms_2$ [T] and a uniaxial magnetic anisotropy $ku_2$ [J/m$^3$] and that the easy axes of the two materials run parallel to each other. At this time, the average saturation magnetization ms [T] and the uniaxial magnetic anisotropy $ku_1$ J/m³ of the compound system may be found from the following equations 1 and 2:

$$ms = (t_1 \cdot ms_1 + t_2 \cdot ms_2)/(t_1 + t_2) \quad (1)$$

and $$ku = (t_1 \cdot ku_1 + t_2 \cdot ku_2)/(t_1 + t_2) \quad (2).$$

Since the coercivity hc is expressed as approximately one-half of the anisotropic magnetic field hk=2 ku/ms, it is expressed in this compound system by the following equation (3):

$$hc = (t_1 \cdot ku_1 + t_2 \cdot ku_2)/(t_1 \cdot ms_1 + t_2 \cdot ms_2) \quad (3)$$

If now the pinning layer 102 meets the aforementioned two conditions, that it is high in magnetic anisotropy and low in saturation magnetization flux density in comparison with the recording layer 103, the magnetic anisotropy ku of the present compound system is higher than the magnetic anisotropy $ku_1$ of a system comprised only of the ferromagnetic layer, while its coercivity is higher than $ku_1/ms_1$ of a system comprised only of the recording layer 103. Therefore, the compound system has a stable direction of magnetization of the recording than the system comprised only of the recording layer 103.

As a method for increasing coercivity by increasing the energy of magnetic anisotropy of the particles of the magnetic material, there may be exemplified a 'method utilizing an anti-ferromagnetic material'. This method has been discovered from the phenomenon in which the hysteresis curve of magnetization is shifted in the transverse direction on oxidizing the surface of the Co particles.

Figure 3:
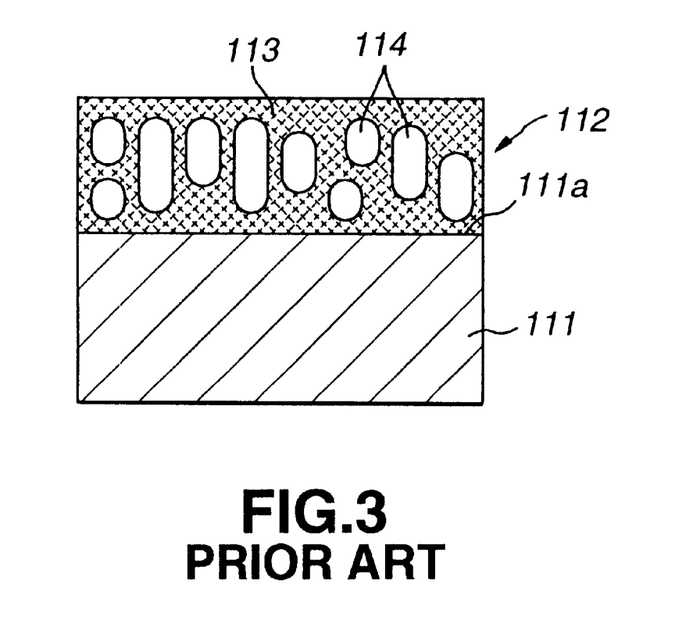
FIG. 3 is a cross-sectional view showing another illustrative structure of a conventional magnetic recording medium.

Among the thin-film type magnetic recording mediums, there is such a one in which oxygen is introduced at the time of deposition of a magnetic metal so that, in the interior of a magnetic layer 112 formed on a major surface 111a of a substrate 111, particles of the magnetic material 114 as metal particles are isolated by a non-ferromagnetic material, such as an oxide, as shown in FIG. 3. That is, the magnetic material is fractionated into magnetically independent fine particles to enable high density recording. Also, in this magnetic layer 112, it is possible for an anti-ferromagnetic material, such as NiO, or fine particles of a permanent magnet having a giant magnetic anisotropy to be contained in the non-ferromagnetic material, so that, by coupling thereto, magnetization of the particles of the magnetic material 114 is pinned to increase the energy of magnetic anisotropy of the particles of the magnetic material 114 to increase the coercivity.

However, none of the above-described methods is sufficient to procure a high energy of magnetic anisotropy of the particles of the magnetic material to increase coercivity to cope with the future higher recording density, if the demand for a thin thickness of the recording layer and a fine grain size of the particles of the magnetic material is to be met.

SUMMARY OF THE INVENTION

It is therefore an object of the present invention to provide a magnetic recording medium in which a high energy of magnetic anisotropy of the particles of the magnetic material responsible for recording is assured and the coercivity is improved to cope with the further higher recording density in future, while the demand for thin thickness of the recording layer and fine grain size of the particles of the magnetic material is met.

If the ferromagnetic recording layer and the anti-ferromagnetic layer are layered together, with the anti-ferromagnetic layer operating as a pinning layer, it is possible to procure a high energy of magnetic anisotropy of the particles of the ferromagnetic material responsible for recording and to raise the coercivity to cope with future higher density recording, while the demand for a thin thickness of the ferromagnetic recording layer and a fine grain size of the particles of ferromagnetic material is met.

If the surface of the Co particles is oxidized, as described above, there is formed a thin CoO layer on the surface of the CoO particle. However, if the CoO as the anti-ferromagnetic material is in contact with a different sort of the ferromagnetic material, magnetic ions of the anti-ferromagnetic material are magnetically coupled to magnetic ions of the ferromagnetic material, with the magnetic moments of the two being parallel or antiparallel to each other.

In the compound system of the ferromagnetic material and the anti-ferromagnetic material, if the magnetic moment of the ferromagnetic material is about to be oriented along the direction of the magnetic field, it drags the magnetic moment of the anti-ferromagnetic material coupled thereto. Therefore, if the axes of magnetic anisotropy of the ferromagnetic material and the anti-ferromagnetic material are properly matched to each other, such as when the easy axes of the ferromagnetic material and the anti-ferromagnetic material are parallel to each other, the external magnetic field has to perform the work to overcome not only the magnetic anisotropy of the ferromagnetic material but also the sum thereof with the magnetic anisotropy of the anti-ferromagnetic material in order to change the direction of magnetization of the ferromagnetic material. The result is that, in this compound system, there is realized the coercivity larger than that in the system of the ferromagnetic material alone. That is, the magnetization of the ferromagnetic material is in a state of being pinned to the anti-ferromagnetic material.

It is another object of the present invention to provide a magnetic recording medium which, while satisfying the demand for a thin thickness of the ferromagnetic recording layer and a fine grain size of the ferromagnetic material, realizes a high energy of magnetic anisotropy of the particles of the magnetic material responsible for recording and elevates the coercivity to allow to cope with higher recording density expected in future.

The present invention provides a magnetic recording medium having a ferromagnetic recording layer on a substrate, wherein an anti-ferromagnetic layer is layered on at least one of the opposite major surfaces of the ferromagnetic recording layer along the direction of thickness thereof.

In the magnetic recording medium of the present invention, it is desirable for magnetization of the vicinity of the surface of the anti-ferromagnetic layer facing the ferromagnetic recording layer, more correctly, the magnetic moment of a sub-lattice, to be rotated with magnetization of the ferromagnetic recording layer at the time of inversion of magnetization of the ferromagnetic recording layer by the external magnetic field.

In the interior of the anti-ferromagnetic material constituting the anti-ferromagnetic layer, a continues region having the aligned direction of the magnetization of the sub-lattice exhibiting the anti-ferromagnetic order is recognized to be a sole anti-ferromagnetic magnetic domain. It is probable that plural regions having magnetic moments of a sub-lattice aligned in different directions exist in the anti-ferromagnetic material. The distribution of these regions is termed an anti-ferromagnetic magnetic domain structure. That is, of the plural anti-ferromagnetic magnetic domain structures, the magnetic domain structure of the vicinity of the facing surface to the ferromagnetic recording layer is desirably coincident with the magnetic domain structure of the ferromagnetic recording layer. In this case, if desired to reverse magnetization of the ferromagnetic recording layer, an external magnetic field sufficient to reverse the magnetization of the anti-ferromagnetic magnetic domains in the vicinity of the facing surface of the anti-ferromagnetic layer is required, so that the energy of magnetic anisotropy of the particles of the ferromagnetic material of the ferromagnetic recording layer is apparently increased to elevate the coercivity.

In the magnetic recording medium of the present invention, the intensity of the exchange coupling operating between the ferromagnetic recording layer and the anti-ferromagnetic layer is preferably larger than the total magnetic anisotropy of the anti-ferromagnetic layer.

If the intensity of the exchange coupling operating between the ferromagnetic recording layer and the anti-ferromagnetic layer is larger than the total magnetic anisotropy of the anti-ferromagnetic layer, the magnetic moments of the anti-ferromagnetic layer are also rotated completely if magnetization of the ferromagnetic recording layer is rotated. That is, the magnetic field necessary to cause inversion of magnetization of the ferromagnetic recording layer is of a magnitude sufficient to cause inversion of magnetization of the anti-ferromagnetic layer simultaneously, such that the energy of magnetic anisotropy of the particles of the ferromagnetic material of the ferromagnetic recording layer is apparently increased to increase the coercivity.

Moreover, if, in the magnetic recording medium of the present invention, the intensity of exchange coupling operating between the ferromagnetic recording layer and the anti-ferromagnetic layer is smaller than the total magnetic anisotropy of the anti-ferromagnetic layer, the intensity of the exchange coupling operating between the ferromagnetic recording layer and the anti-ferromagnetic layer is preferably larger than the magnetic domain energy of the anti-ferromagnetic layer.

If the magnetic moments on the surface of the anti-ferromagnetic layer facing the ferromagnetic recording layer is about to be rotated by this exchange coupling in meeting with the inversion of magnetization of the ferromagnetic recording layer, the magnetic moments in the interior of the anti-ferromagnetic layer assume a spiral array with progressively changing orientation across a number of atomic layers along the direction of thickness, while the magnetic moments in the recessed portion are not changed in orientation. In this case, the magnetic field necessary to reverse the direction of the magnetic moments on the facing surface of the anti-ferromagnetic layer is of a magnitude to enable the orientation of the magnetic moments of the facing side of the anti-ferromagnetic layer to be changed, such that the energy of magnetic anisotropy of the particles of the ferromagnetic recording layer is apparently increased to elevate the coercivity.

In this case, the exchange constant on the interface between the ferromagnetic recording layer and the anti-ferromagnetic layer is not less than $1 \times 10^{-12}$ [erg/cm].

Also, in this case, the ferromagnetic recording layer preferably is a ferromagnetic film with a film thickness not larger than 100 nm having soft magnetic properties with the anisotropic magnetic field not larger than 100 Oe or a ferromagnetic film with a film thickness not larger than 100 nm having hard magnetic properties with the anisotropic magnetic field not less than 100 Oe.

In addition, the anti-ferromagnetic layer is such an anti-ferromagnetic layer with an exchange constant not less than $1 \times 10^{-10}$ [erg/cm] and an energy of magnetic anisotropy of $1 \times 10^{3}$ [erg/cm$^3$], having magnetic moments ferromagnetically arrayed on the facing side to the to the ferromagnetic recording layer, or such an anti-ferromagnetic layer with an exchange constant not less than $1 \times 10^{-9}$ [erg/cm] and a energy of magnetic anisotropy of $1 \times 10^{4}$ [erg/cm$^3$], having magnetic moments anti-ferromagnetically arrayed on the facing side to the ferromagnetic recording layer.

Also, in the magnetic recording medium according to the present invention, the anti-ferromagnetic layer includes a first region rotated with magnetization of the ferromagnetic recording layer, at the time of inversion of magnetization of the ferromagnetic recording layer by the external magnetic field on the facing side to the ferromagnetic recording layer, in keeping with magnetization of the ferromagnetic recording layer, and a second region not rotated with magnetization of the ferromagnetic recording layer at the time of inversion of magnetization of the ferromagnetic recording layer by the external magnetic field, with the first region being broader than the second region.

If the structure of the interface on the atomic level is considered, the interface is not a geometrical plane, with the bondage of atoms of the magnetic material on both sides of the interface not being uniform due to step density of the interface. Therefore, it is likely that the region with interrupted bondage co-exists with the region with non-interrupted bondage such that these two regions are present in the anti-ferromagnetic layer. If the region having non-interrupted bondage to the ferromagnetic recording layer and which is rotated with magnetization of the ferromagnetic recording layer, at the time of inversion of magnetization of the ferromagnetic recording layer by the external magnetic field on the facing side to the ferromagnetic recording layer, in keeping with magnetization of the ferromagnetic recording layer, is broader than the second region having the interrupted bondage to the ferromagnetic recording layer and which is not rotated with magnetization of the ferromagnetic recording layer at the time of inversion of magnetization of the ferromagnetic recording layer by the external magnetic field, the magnetic field necessary to reverse the magnetization of the ferromagnetic recording layer is of a magnitude to change the orientation of magnetization of the first region of the anti-ferromagnetic layer to raise the energy of magnetic anisotropy of the particles of the ferromagnetic recording layer apparently to improve the coercivity.

Also, in this case, an intermediate layer mainly composed of Fe or Co is preferably interposed between the ferromagnetic recording layer and the anti-ferromagnetic layer.

The ferromagnetic metals, such as Fe or Co, having large magnetic moments per atom, tend to be exchange-coupled to extraneous substances, so that, if these metals are interposed, it is possible to increase the bondage between the ferromagnetic recording layer and the anti-ferromagnetic layer.

The magnetic recording medium of the present invention has a ferromagnetic recording layer on its substrate, and has an anti-ferromagnetic layer layered on at least one of the major surfaces lying opposite to each other in the direction along the thickness of the ferromagnetic recording layer, so that the anti-ferromagnetic layer operates as a pinning layer, and hence the high energy of magnetic anisotropy of the particles of the ferromagnetic recording layer responsible for recording and improved coercivity may be realized while maintaining thin thickness of the ferromagnetic recording layer and the fine particle size of the ferromagnetic material. Moreover, it is possible to cope with higher recording density which may be expected in future.

DESCRIPTION OF THE PREFERRED EMBODIMENTS

Referring to the drawings, preferred embodiments of the present invention will be explained in detail.

A magnetic recording medium according to the present invention includes a ferromagnetic recording layer on a substrate, wherein an anti-ferromagnetic layer is layered on at least one of the opposite major surfaces of the ferromagnetic recording layer along the direction of thickness thereof.

The anti-ferromagnetic layer is arranged as an underlying layer for the ferromagnetic recording layer between the ferromagnetic recording layer and the substrate. Alternatively, the anti-ferromagnetic layer is arranged on the surface of the ferromagnetic recording layer so as to be used simultaneously as a protective layer for the ferromagnetic recording layer. Still alternatively, the anti-ferromagnetic layer is arranged as an underlying layer and a protective layer on both sides of the ferromagnetic recording layer.

An example of the anti-ferromagnetic layer operating as a protective film for the ferromagnetic recording layer uses an oxide NiO as the anti-ferromagnetic film, while an example of the anti-ferromagnetic layer operating as the underlying layer and as the protective film uses an Rh—Mn alloy and NiO as the underlying film and as the protective film, respectively.

Figure 4:
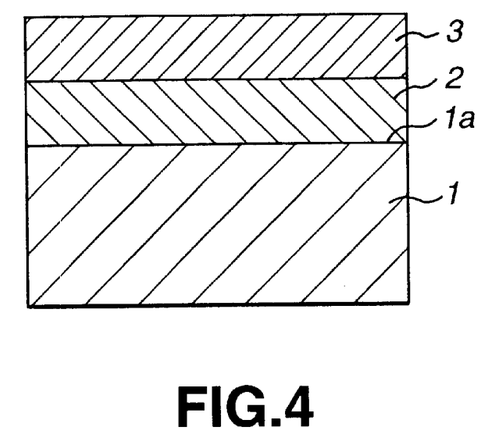
FIG. 4 is a cross-sectional view showing an illustrative structure of a magnetic recording medium according to the present invention.

In the following explanation, it is assumed that the anti-ferromagnetic layer 2 and the ferromagnetic recording layer 3 are layered on a major surface 1a of the substrate 1, as shown in FIG. 4. That is, in the present example, the anti-ferromagnetic layer 2 operates as an underlying layer for the ferromagnetic recording layer 3. A non-magnetic underlying layer etc may occasionally be provided between the substrate 1 and the anti-ferromagnetic layer 2.

The magnetic recording medium embodying the present invention preferably has the following characteristics:

(1) First Embodiment

That is, in the magnetic recording medium embodying the present invention, it is desirable that, at the time of inversion of magnetization of a ferromagnetic recording layer 1 by the external magnetic field, the magnetization in the vicinity of the facing surface of the anti-ferromagnetic layer 2 (ordered magnetic moments of the sub-lattices) to the ferromagnetic recording layer 1 be rotated with magnetization of the ferromagnetic recording layer 1.

A continuous area in the interior of the anti-ferromagnetic material constituting the anti-ferromagnetic layer 2, in which the direction of the ordered magnetic moments having an anti-ferromagnetic order may be recognized as being a sole anti-ferromagnetic domain. It is probable that plural areas having ordered magnetic moments of the sublattices aligned in different directions exist in the anti-ferromagnetic material, this area distribution being termed a anti-ferromagnetic domain structure. That is, the magnetic domain structure of the anti-ferromagnetic domain of the above plural anti-ferromagnetic domains lying in the vicinity of the facing surface to the ferromagnetic recording layer 1 preferably is coincident with the magnetic domain structure of the ferromagnetic recording layer 1. If, in this case, the magnetization of the ferromagnetic recording layer 1 is to be inverted, such an external magnetic field which is sufficient to reverse the magnetization of the anti-ferromagnetic domain in the vicinity of the facing surface to the anti-ferromagnetic layer 2 is required, with the result that the energy of magnetic anisotropy of the particles of the ferromagnetic material of the ferromagnetic recording layer 1 is apparently increased to increase the coercivity.

The magnetic domain structure of the ferromagnetic recording layer can be observed by a variety of techniques, such as polarization microscope, magnetic force microscope (MFM) or a spin polarization scanning type electron microscope.

For observing the magnetic domain of the anti-ferromagnetic layer, X-ray topography, exploiting the distortion of magnetization of a bulk material of the anti-ferromagnetic material constituting the anti-ferromagnetic layer has so far been used. however, this method is difficult to apply to an extremely thin film, such that it is difficult to observe the image of the magnetic domain with high resolution sufficient to visually discern the bit magnetic domain size of high density recording.

However, with recent progress in the high intensity radiation light X-ray source, it has become possible to observe the magnetic domain of the anti-ferromagnetic layer to high resolution even although the film is of an extreme thin thickness.

This is based on the properties of the anti-ferromagnetic material, termed 'X-ray magnetic linear dichroism (XMLD)', in which X-ray absorption of the anti-ferromagnetic material depends on the angle between the direction of the linear polarization of X-rays and the direction of magnetization of anti-ferromagnetic sub-lattices of a specimen. As a measurement device, such a device in which a high intensity linear polarization X-rays of a wavelength suited to produce absorption is illuminated on a specimen placed in vacuum and in which photoelectrons excited by X-rays and radiated from the sample surface are imaged to an enlarged scale by an optical system of the electron microscope. Since the magnetic domains having different directions of the ordered magnetic moments of the sublattices have different X-ray absorptions, the amount of emission of the photoelectrons differ correspondingly, thus giving rise to the contrast in the produced image. That is, an image of a magnetic domain is observed with the difference in the direction of ordered magnetic moments of the sublattices being replaced by the photoelectron absorption. If a similar measurement device is used and circular polarized X-rays are used in place of the linear polarized X-rays, the magnetic domain of the ferromagnetic recording layer can be observed by the X-ray magnetic circular dichroism (XMCD).

If this measurement method is used, it is possible to ascertain whether or not the magnetization of the anti-ferromagnetic layer 2 in the vicinity of the facing surface to the ferromagnetic recording layer 1, more correctly the ordered moments of the sublattices, has been rotated with magnetization of the ferromagnetic recording layer 1.

Among the magnetic recording mediums in which, when the anti-ferromagnetic layer 2 is reversed in magnetization by the external magnetic field of the ferromagnetic recording layer 1, the magnetization in the vicinity of the facing surface to the ferromagnetic recording layer 1, more correctly the ordered moments of the sublattices, is rotated with magnetization of the ferromagnetic recording layer 1, there is such a magnetic recording medium in which the anti-ferromagnetic layer 2 as the underlying layer is a film of an alloy such as Ni—Mn, Rh—Mn or Cr—Mn—Pt or an oxide such as NiO, and a thin film of Co—Cr—Pt is formed as the ferromagnetic recording layer 1.

(2) Second Embodiment

In the magnetic recording medium embodying the present invention, the intensity of exchange coupling between the ferromagnetic recording layer 3 and the anti-ferromagnetic layer 2 is preferably larger than the total magnetic anisotropy of the anti-ferromagnetic layer 2.

The magnitude of the exchange coupling which tends to keep the direction of the magnetic moment of the ferromagnetic recording layer 3 and the direction of one of the sub-lattice magnetic moments in the anti-ferromagnetic layer 2 parallel to each other on both sides of the interface is expressed by the following equation (4):

$$U = -J \cdot \cos(\theta_1 - \theta_2) \quad (4)$$

where U [$J/m^2$] is the potential energy per unit interface area by the two moments, J [$J/m^2$] is an increasing coefficient, $\theta^1$ denotes the direction of the magnetic moment of the ferromagnetic recording layer 3 and $\theta^2$ denotes the direction of the magnetic moment of the anti-ferromagnetic layer 2 by an angle as measured in the plane of the thin film surface.

Also, if the constant of the uniaxial magnetic anisotropy of the anti-ferromagnetic material forming the anti-ferromagnetic layer 2 is $Ku_2$, the energy of magnetic anisotropy Uk over the entire thickness of the anti-ferromagnetic layer 2 is expressed by the following equation 5:

$$UK = -Ku_2 \cdot t_2 \cdot \cos^2(\theta_2 - \theta_{2,0}) \quad (5)$$

where $\theta_{2,0}$ is the direction of the easy axis of the anti-ferromagnetic layer 2.

If J is larger than the total magnetic anisotropy over the entire thickness of the anti-ferromagnetic layer 2, the intensity of the exchange coupling operating between the ferromagnetic recording layer 3 and the anti-ferromagnetic layer 2 is larger than the total magnetic anisotropy of the anti-ferromagnetic layer 2, such that, on rotation of the magnetization of the ferromagnetic recording layer 3, the magnetic moments of the anti-ferromagnetic layer 2 are rotated more completely due to coupling in the interface.

Figure 5A:
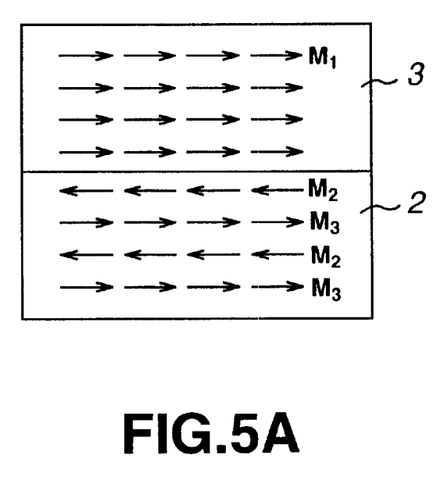
FIGS. 5A and 5B are schematic views showing an illustrative state of the magnetic moment of the ferromagnetic recording layer and an anti-ferromagnetic recording layer.

That is, referring to FIG. 5A, magnetic ions are arrayed as regularly in the anti-ferromagnetic layer 2, however, their magnetic moments are alternately reversed, while remaining parallel to each other, as indicated by arrows $M_2$ and $M_3$. Conversely, magnetic ions of the ferromagnetic recording layer 3 are arrayed as regularly, while their magnetic moments are arrayed in parallel state in the same direction, as indicated by arrow M1, and are reversed from the magnetic moments indicated by arrow $M_2$ on the interface side between the anti-ferromagnetic layer 2 and the ferromagnetic recording layer 3.

Figure 5B:
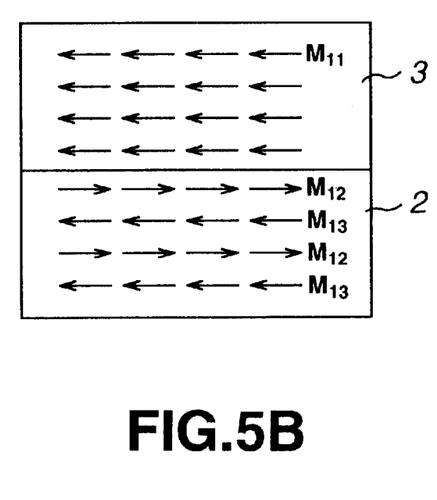

If the ferromagnetic recording layer 3 is reversed in magnetization, the magnetic moments of the ferromagnetic recording layer 3 are aligned in parallel state in the same direction reversed from the direction of arrow $M_1$ in FIG. 5B, as indicated by arrow $M_{11}$. That is, the magnetization is reversed.

Since the intensity of the exchange coupling operating at this time between the ferromagnetic recording layer 3 and the anti-ferromagnetic layer 2 is stronger than the total magnetic anisotropy of the anti-ferromagnetic layer 2, as discussed above, the magnetic moments of the anti-ferromagnetic layer 2 are aligned in alternately antiparallel states indicated by arrows $M_{12}$, $M_{13}$ opposite to the antiparallel state indicated by arrows $M_2$ and $M_3$ in FIG. 5A, thus indicating inversion of magnetization.

Stated differently, if the intensity of the exchange coupling operating between the ferromagnetic recording layer 3 and the anti-ferromagnetic layer 2 is larger than the total magnetic anisotropy of the anti-ferromagnetic layer 2, the magnetic field required for inversion of magnetization of the ferromagnetic recording layer 3 needs to be large enough to cause inversion of magnetization of the anti-ferromagnetic layer 2 simultaneously, thus apparently increasing the energy of magnetic anisotropy of the particles of the ferromagnetic material of the ferromagnetic recording layer 3 to increase the coercivity.

Although the foregoing description is based on uniaxial anisotropy, it is possible to design the medium, taking energy competition into account, even in case of anisotropy of different symmetry.

Figure 6A:
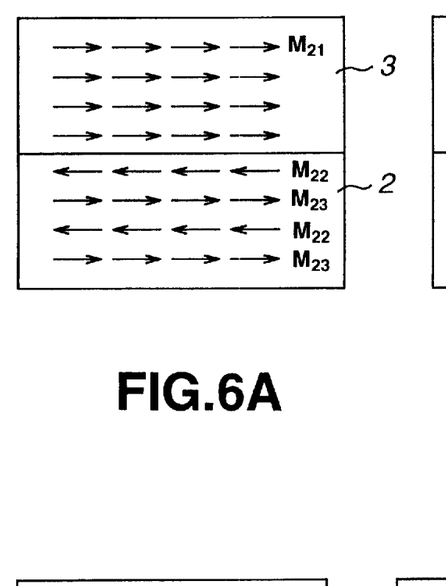
FIGS. 6A and 6B are schematic views showing another illustrative state of the magnetic moment of the ferromagnetic. recording layer and an anti-ferromagnetic recording layer.

If the intensity of the exchange coupling operating between the ferromagnetic recording layer 3 and the anti-ferromagnetic layer 2 is not larger than the total magnetic anisotropy of the anti-ferromagnetic layer 2, the intensity of the exchange coupling between the ferromagnetic recording layer 3 and the anti-ferromagnetic layer 2, represented by the potential energy shown by the equation 4, is insufficient to keep the magnetic moments $\theta_1, \theta_2$ of the ferromagnetic recording layer 3 and the anti-ferromagnetic layer 2 matched to each other, so that the ferromagnetic recording layer 3 is unable to rotate the magnetic, moments of the anti-ferromagnetic layer 2 simultaneously.

That is, in the anti-ferromagnetic layer 2, the magnetic ions of the anti-ferromagnetic layer 2 are arrayed as regularly, however, their magnetic moments are alternately anti-parallel as indicated by arrows $M_{22}$ and $M_{23}$ in FIG. 6A. Conversely, the magnetic ions of the ferromagnetic recording layer 3 are aligned as regularly, while their magnetic moments are aligned in the parallel state in the same direction, as indicated by arrow $M_{21}$, and are reversed with respect to the magnetic moments indicated by arrow $M_{22}$ on the interface side of the anti-ferromagnetic layer 2 to the ferromagnetic recording layer 3.

Figure 6B:
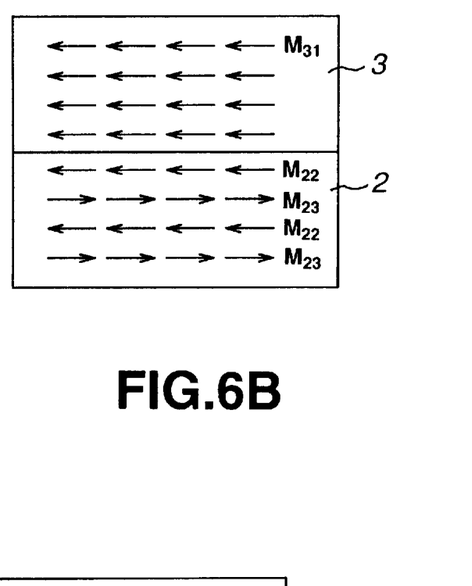

If the ferromagnetic recording layer 3 is reversed in magnetization, the magnetic moments of the ferromagnetic recording layer 3 are aligned in a parallel state in the same direction opposite to the direction indicated by arrow $M_{21}$ in FIG. 6A, as indicated by arrow $M_{31}$ in FIG. 6B.

However, since the intensity of the exchange coupling operating between the ferromagnetic recording layer 3 and the anti-ferromagnetic layer 2 is not larger than the total magnetic anisotropy of the anti-ferromagnetic layer 2, the magnetic moments of the anti-ferromagnetic layer 2 are alternately antiparallel in the same directions as those indicated by arrows $M_{22}$, $M_{23}$ in FIG. 5A, as indicated by arrows $M_{22}$, $M_{23}$ in FIG. 6B. That is, the direction of the magnetic moment of the anti-ferromagnetic layer 2 is not changed. This state is sometimes expressed as 'moment alignment by exchange coupling being turned off'.

Considering the process of magnetization when this turning-off occurs, the 'exchange biasing' state prevails in which the magnitude of the torque applied to the ferromagnetic recording layer 3 is different depending on the direction of magnetization of the ferromagnetic recording layer 3, as may be seen from the equation 4, so that the magnitude of the coercivity differs with the direction of magnetization. That is, there is observed the horizontally shifted hysteresis curve of magnetization. This asymmetry of the coercivity is not desirable for a magnetic recording medium since it is inconvenient for recording, while resistance to thermal fluctuations also depends on the recording polarity.

(3) Third Embodiment

In the above-described magnetic recording medium, embodying the present invention, it is desirable that the intensity of exchange coupling operating between the ferromagnetic recording layer 3 and the anti-ferromagnetic layer 2 is smaller than the total magnetic anisotropy of the anti-ferromagnetic layer 2, and that the intensity of the exchange coupling operating between the ferromagnetic recording layer 3 and the anti-ferromagnetic layer 2 is larger than the energy of the magnetic domain of the ferromagnetic recording layer 3.

Specifically, with the exchange constant on the layering interface between the anti-ferromagnetic layer 2 and the ferromagnetic recording layer 3 is Ai, and the lattice constant is a the magnetic coupling energy per unit area is expressed as $\Delta\beta i = 2Ai/a$. If the exchange constant of the anti-ferromagnetic layer 2 is $A_{AF}$ and the energy of magnetic anisotropy is $K_{AF}$, the magnetic domain energy of the anti-ferromagnetic layer 2 is expressed as $$\Delta\sigma_{AF} = 4\sqrt{(A_{AF}K_{AF}t_2^2)}$$

If, when the anti-ferromagnetic layer 2 and the ferromagnetic recording layer 3 are layered together, the exchange bias magnetic field Hex is not to be presented, but only the coercivity Hc is to be presented in the exchange bias characteristics, the condition of $\Delta\beta i > \Delta\beta_{AF}$ is essential. In this state, since the spin on the side of the anti-ferromagnetic layer 2 facing the ferromagnetic recording layer 3 is rotated simultaneously as the spin of the ferroimagnetic recording layer 3, the giant coercivity of the anti-ferromagnetic layer 2 is accorded to the ferromagnetic recording layer 3. It is noted that the giant coercivity means the spin axis flopping magnetic field proportionate to $$\sqrt{(A_{AF}K_{AF})}$$

and may reach even tens to hundreds of kOe.

In particular, if the anti-ferromagnetic layer 2 is of an increased thickness, the total energy of magnetic anisotropy is increased with increase in the thickness $t_2$, as may be seen from the above equation 5, until eventually it exceeds the intensity of the exchange coupling between the ferromagnetic recording layer 3 and the anti-ferromagnetic layer 2 to reach the aforementioned exchange bias state.

However, if the intensity of the exchange coupling operating between the ferromagnetic recording layer 3 and the anti-ferromagnetic layer 2 is larger than the magnetic domain energy of the ferromagnetic recording layer 3, the magnetic moments on the facing side of the anti-ferromagnetic layer 2 facing the ferromagnetic recording layer 3 tend to be rotated in conjunction with the inversion of magnetization of the ferromagnetic recording layer 3 by this exchange coupling, even if the intensity of the exchange coupling operating between the ferromagnetic recording layer 3 and the anti-ferromagnetic layer 2 is smaller than the total magnetic anisotropy of the ferromagnetic recording layer 3, such that the magnetic moments in the inside of the anti-ferromagnetic layer 2 assume a spiral array over a large number of atomic layers along the direction of thickness with slight change in direction from one atomic layer to another, with the magnetic moments in the recessed portion of the anti-ferromagnetic layer 2 not being changed in direction.

Figure 7A:
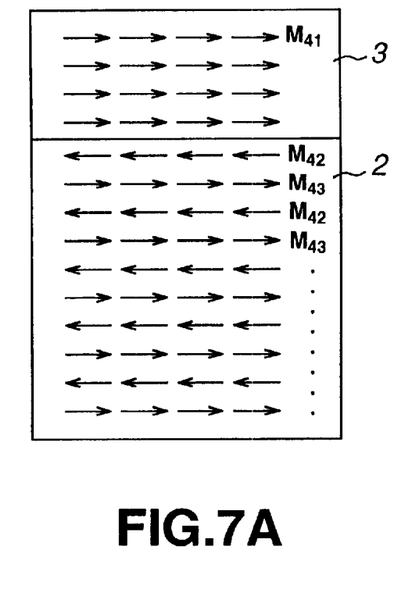
FIGS. 7A and 7B are schematic views showing yet another illustrative state of the magnetic moment of the ferromagnetic recording layer and an anti-ferromagnetic recording layer.

That is, referring to FIG. 7A, the magnetic ions in the anti-ferromagnetic layer 2 are arrayed regularly, however, their magnetic moments are alternately anti-parallel as indicated by arrows $M_{42}$, $M_{43}$ in FIG. 7A. Conversely, the magnetic ions of the ferromagnetic recording layer 3 are not only arrayed as regularly, but also their magnetic moments are aligned in the same direction, as indicated by arrow $M_{41}$, and are reversed in direction from the magnetic moments indicated by arrow $M_{42}$ on the interface side of the anti-ferromagnetic layer 2 facing the ferromagnetic recording layer 3.

Figure 7B:
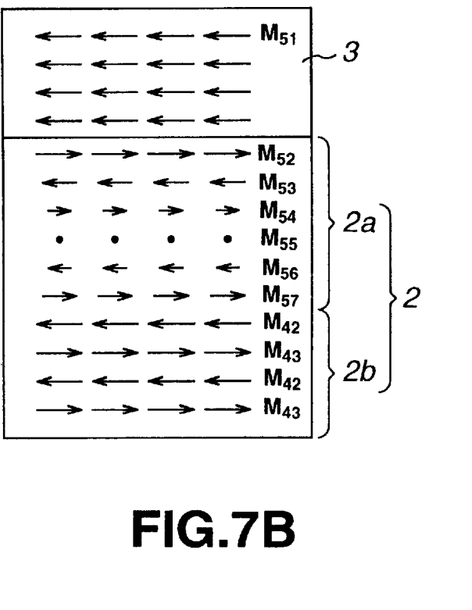

If the ferromagnetic recording layer 3 is reversed in magnetization, the magnetic moments of the ferromagnetic recording layer 3 are aligned in the parallel state in an opposite direction to the direction indicated by arrow $M_{41}$ in FIG. 7A, as shown by arrow $M_{51}$ in FIG. 7B, thus reversing the magnetization.

Since the intensity of the exchange coupling operating between the ferromagnetic recording layer 3 and the anti-ferromagnetic layer 2 is smaller than the total magnetic anisotropy of the anti-ferromagnetic layer 2, the magnetic moments of the anti-ferromagnetic layer 2 are not rotated by the exchange coupling.

However, since the intensity of the exchange coupling operating between the ferromagnetic recording layer 3 and the anti-ferromagnetic layer 2 is larger than the magnetic domain energy of the anti-ferromagnetic layer 2, the magnetic moments on the side of the anti-ferromagnetic layer 2 facing the ferromagnetic recording layer 3 is rotated in the opposite direction to that shown by arrow $M_{42}$ in FIG. 7A, as indicated by arrow $M_{52}$ in FIG. 7B. With this rotation, the magnetic moments in the interior of the anti-ferromagnetic layer 2 assume the spiral array across a large number of atomic layers along the thickness of the anti-ferromagnetic layer 2, as indicated by arrows $M_{53}$, $M_{54}$, $M_{55}$, $M_{56}$ and $M_{57}$ in FIG. 7B, slightly changed in orientation from one atomic layer to another, while the magnetic moments in the recessed portion of the anti-ferromagnetic layer 2 are not changed in orientation, as indicated by arrows $M_{42}$ and $M_{43}$ in FIG. 7B. The transition area of the spiral change of the orientation of the magnetic moments represents the magnetic wall in the interior of the anti-ferromagnetic layer 2 and is termed an interfacial magnetic wall since it is formed in adjacency to the interface.

Considering the process of magnetization, the magnetic moments in the interior of the interfacial magnetic wall are dragged to a more or less extent by the ferromagnetic recording layer 3. Thus, in meeting with the amount of the work resisting the anisotropy, the magnetic field required to effect inversion of magnetization of the ferromagnetic recording layer 3 is of a magnitude that is able to change the orientation of the magnetic moments on the facing side of the anti-ferromagnetic layer 2. Thus, the energy of magnetic anisotropy of the particles of the ferromagnetic recording layer 3 is apparently increased to elevate the coercivity.

The magnetic moments in the recessed part of the anti-ferromagnetic layer 2, not changed in direction, afford exchange bias to an upper layer, as a principle, however, since the magnetic moments are changed only gradually in direction in the thick interfacial magnetic wall, the torque tending to annul the distortion is small and hence no outstanding asymmetry is produced in the coercivity.

In this case, the exchange constant on the interface between the ferromagnetic recording layer 3 and the anti-ferromagnetic layer 2 is preferably not less than $1 \times 10-12$ erg/cm.

The ferromagnetic recording film constituting the ferromagnetic recording layer 3 is preferably a ferromagnetic film having soft magnetic properties with the anisotropic magnetic field not larger than 100 Oe and a film thickness not larger than 100 nm or a ferromagnetic film having hard magnetic properties with the coercivity of not less than 100 Oe and a film thickness not larger than 100 nm.

Also, in this case, the anti-ferromagnetic layer 2 is preferably an anti-ferromagnetic layer having an exchange constant not less than $1 \times 10^{-10}$ erg/cm and an anisotropic energy of not less than $1 \times 10^3$ erg/cm3 and the magnetic moments of which are ferromagnetically arrayed on its facing side to the ferromagnetic recording layer 3, or an anti-ferromagnetic layer having an exchange constant not less than $1 \times 10^{-9}$ erg/cm and an anisotropic energy of $1 \times 10^4$ erg/cm$^3$ and the magnetic moments of which are anti-ferromagnetically arrayed on its facing side to the ferromagnetic recording layer 3.

Examples of the magnetic recording mediums having the strength of the exchange coupling operating between the ferromagnetic recording layer 3 and the anti-ferromagnetic layer 2 smaller than the total magnetic anisotropy of the anti-ferromagnetic layer 2 and larger than the magnetic domain energy of the anti-ferromagnetic layer 2, areas follows:

As a first example, there is such a magnetic recording medium which controls the orientation of the major surface 1a carrying the anti-ferromagnetic layer 2 of the substrate 1 or which includes an underlying layer between the substrate 1 and the anti-ferromagnetic layer 2 to control the wettability of the interface or the ordered state of the anti-ferromagnetic layer 2 to achieve the above-mentioned characteristics.

A second example is such a magnetic recording medium in which, when forming the anti-ferromagnetic layer 2 on the substrate 1, the anti-ferromagnetic layer 2 is formed by sputtering or vapor deposition, as the substrate 1 is heated, to control the wettability of the interface or the ordered state of the anti-ferromagnetic layer 2 to achieve the above-mentioned characteristics.

A third example is such a magnetic recording medium in which the surface of the anti-ferromagnetic layer 2 is processed with back-sputtering, ion milling or reactive etching to reduce the film thickness of the surface of the anti-ferromagnetic layer by physical and/or chemical means to reduce the exchange anisotropic energy or the magnetic domain energy to achieve the above-mentioned characteristics.

A fourth example is such a magnetic recording medium in which the anti-ferromagnetic layer 2 and the ferromagnetic recording layer 3 arg formed by sputtering or vapor deposition in a clean atmosphere of the degree of vacuum of $1 \times 10^{-6}$ Torr to increase the magnetic coupling energy therebetween to achieve the above-mentioned characteristics.

A fifth example is such a magnetic recording medium in which, after layering the anti-ferromagnetic layer 2 and the ferromagnetic recording layer 3, annealing in a magnetic field, baking or electron beam heating is carried out to increase the magnetic coupling energy between the layers 2, 3 to achieve the above-mentioned characteristics.

(4) Fourth Embodiment

Also, in the above-described magnetic recording medium embodying the present invention, the anti-ferromagnetic layer 2 preferably has a first region whose magnetization is rotated with magnetization of the ferromagnetic recording layer 3, at the time of inversion of magnetization by the external magnetic field of the ferromagnetic recording layer 3 on its side facing the ferromagnetic recording layer 3, and a second region whose magnetization is not rotated with magnetization of the ferromagnetic recording layer 3 at the time of inversion of magnetization by the external magnetic field of the ferromagnetic recording layer 3.

If the structure of the interface on the atomic level, the interface is not a geometric plane, with the bondage of atoms of the magnetic material on both sides of the interface being not uniform due to, for example, step density of the interface. Thus, there is a possibility of co-existence of a region of interrupted bondage and a region of non-interrupted bondage, such that the above-described two regions may be present in the anti-ferromagnetic layer. These regions are not necessarily associated with the relative strength of bondage and are governed in association with ease in rotation of the anti-ferromagnetic moments in a recessed portion removed from the interface. It maybe contemplated that the inner portions of the anti-ferromagnetic layer 2 are not bonded uniformly with the ferromagnetic recording layer 3 and that, as shown exploded in FIG. 8, the ferromagnetic recording layer 3 is magnetically coupled to the entire portions of the anti-ferromagnetic layer 2, there being a first region 2c accounting for the major portion of the interface side of the anti-ferromagnetic layer 2 and whose magnetization is rotated with the magnetization of the ferromagnetic recording layer 3 at the time of inversion of magnetization by the external magnetic field of the ferromagnetic recording layer 3 and a second region 2d whose magnetization is not rotated with magnetization of the ferromagnetic recording layer 3 at the time of inversion of magnetization by the external magnetic field of the ferromagnetic recording layer 3.

Figure 8:
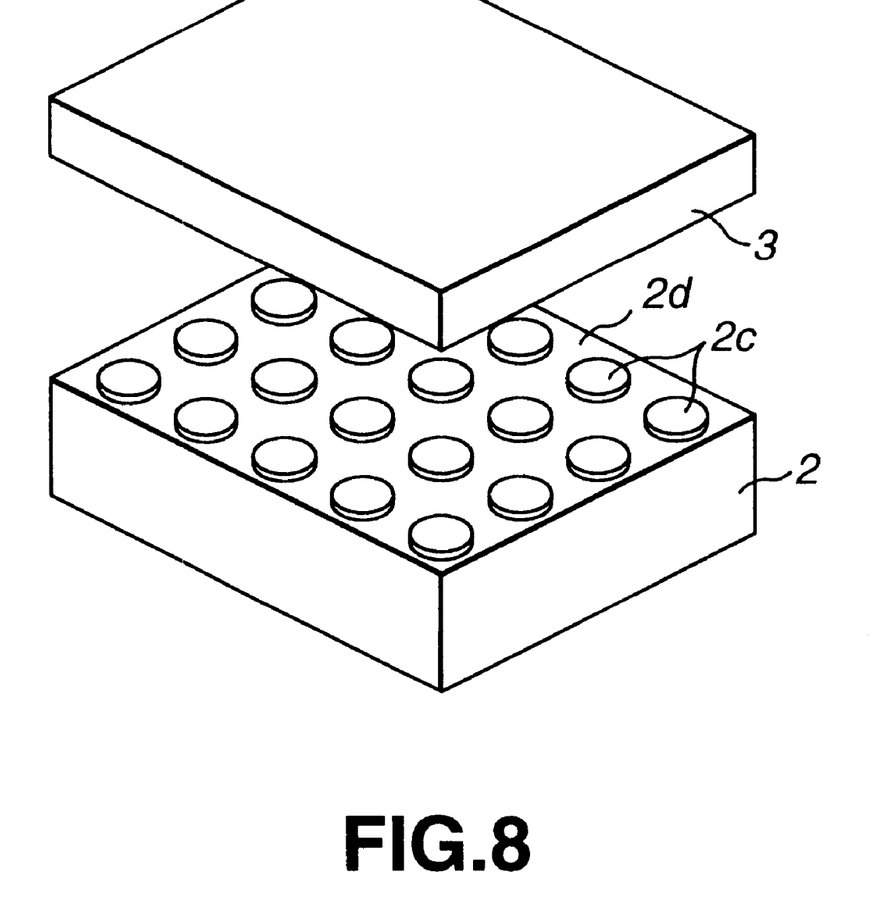
FIG. 8 is an enlarged schematic perspective view showing the state in the interior of an anti-ferromagnetic recording layer.

If the bondage to the ferromagnetic recording layer 3 is not interrupted and, at the time of inversion of magnetization by the external magnetic field of the ferromagnetic recording layer 3, the first region 2c whose magnetization is rotated with magnetization of the ferromagnetic recording layer 3 is broader than the second region 2d whose bondage to the ferromagnetic recording layer 3 is interrupted and whose magnetization is not rotated with magnetization of the ferromagnetic recording layer 3, the magnetic field necessary to cause inversion of magnetization with magnetization of the ferromagnetic recording layer 3 is just large enough to cause the orientation of magnetization of the first region 2c of the anti-ferromagnetic layer 2, with the result that the apparent energy of magnetic anisotropy of the particles of the ferromagnetic material of the ferromagnetic recording layer 3 is increased to raise the coercivity.

It is desirable in this case that an intermediate layer mainly composed of Fe or Co be interposed between the ferromagnetic recording layer and the anti-ferromagnetic layer.

The ferromagnetic metals having large magnetic moments per atom, such as Fe or Co, is liable to form exchange coupling with extraneous materials, such that the interposition of these metals improves the bondage between the ferromagnetic recording layer and the anti-ferromagnetic layer.

The magnetic recording medium in which the anti-ferromagnetic layer 2 has the first region 2c whose magnetization is rotated with the magnetization of the ferromagnetic recording layer 3 at the time of inversion of magnetization by the external magnetic field of the ferromagnetic recording layer 3 and the second region 2d whose magnetization is not rotated with magnetization of the ferromagnetic recording layer 3 at the time of inversion of magnetization by the external magnetic field of the ferromagnetic recording layer 3, with the first region being broader than the second region, may be such a magnetic recording medium having an underlying layer composed of, for example, Cr, on a substrate mainly composed of aluminum and also containing Mg, and having on the underlying layer an anti-ferromagnetic layer of an alloy, such as Ni—Mn, Rh—Mn or Cr—Mn—Pt or an oxide such as NiO, and a Co layer for assisting in the exchange coupling between the anti-ferromagnetic layer and a ferromagnetic recording layer which is formed thereon and which is composed of an alloy such as Co—Cr, Co—Cr—Pt, Co—Cr—Ta, Co—Cr—Ta, Co—Pt—B—O or Co—Fe.

The above-described Co—Fe is low in magnetic anisotropy and is insufficient in coercivity such that it cannot be used up to now as the ferromagnetic recording layer. However, it can be sufficiently used if the anti-ferromagnetic layer formed as the underlying layer as in the present invention assists in the anisotropy of the ferromagnetic recording layer to improve the coercivity, since then the magnetic recording medium in its entirety can satisfy the requirements. By so doing, the material of higher magnetic flux density than the conventionally used material can be used, such that it is possible to elevate the remanent magnetic flux density Mr to secure the stray magnetic field $\phi = A \cdot Mr \cdot t$ required for reproduction even if the ferromagnetic recording layer is of an extremely reduced thickness.

That is, in the above-described magnetic recording medium of the present invention, in which the anti-ferromagnetic layer is formed on at least one of the two major surfaces of the ferromagnetic recording layer formed on the substrate, the anti-ferromagnetic layer operates as the pinning layer, such that, while the demand for reduced film thickness of the ferromagnetic recording layer 3 and comminution of the particles of the ferromagnetic material is subsequently met, the high energy of magnetic anisotropy of the ferromagnetic grains and the higher coercivity are secured to cope with further increase in the recording density in future.

Also, by providing the high energy of magnetic anisotropy of the ferromagnetic grains, the anisotropic magnetic field is increased to render it possible to reduce the film thickness of the ferromagnetic recording layer beyond the limit of the thin film thickness determined by the superparamagnetism and to reduce the grain size of the ferromagnetic grains. This renders it possible to raise the linear recording density or the track density of the magnetic recording medium to cope with the higher recording density.

By layering the anti-ferromagnetic layer and the ferromagnetic recording layer in this manner, the anti-ferromagnetic layer can be increased in volume in comparison with the case in which the anti-ferromagnetic layer is contained only on the grain boundary of the ferromagnetic material. The film thickness thicker to some extent is favorable in affording stabilized control of the physical properties. Also, the above layering enders it possible to raise the packing density of the ferromagnetic material in the surface of the ferromagnetic recording layer.

In the recording process in which the magnetic recording medium is magnetized by an external magnetic field from a writing magnetic head, the magnetic field acting on the minute area to be magnetized is a combined magnetic field composed of the magnetic field from the magnetic head and a magnetic field from the rim of the magnetic head and from the recessed portion of the ferromagnetic portion superimposed thereon. If the latter magnetic field is increased, a sufficient magnetic field cannot be afforded to the small-sized area with the stray magnetic field from the narrow magnetic gap. This is one of the reasons the high density recording needs a thin recording layer. If magnetic anisotropy is high and a hard magnetic material analogous with the permanent magnet is used as an underlying layer to form the ferromagnetic recording layer, the counter magnetic field is increased, even although the pinning of magnetization is achieved. However, if the anti-ferromagnetic layer is formed as the underlying layer as in the present invention, there is no risk of the back magnetic field at the time of writing since no magnetic field is produced in the outside. Thus, a sufficient magnetic field is obtained with the conventional magnetic head without increasing the back magnetic field at the writing time because no external magnetic field is produced.

There is also a merit from the viewpoint of preventing demagnetization of the recorded magnetization pattern. The anti-ferromagnetic domain does not produce magnetic fields in its vicinity, while it does not produce static magnetic field energy even if magnetic domains of opposite polarities face each other. Thus, even if the medium is increased in thickness by the layering of the ferromagnetic recording layer and the anti-ferromagnetic layer, the static magnetic field energy as a motive power for demagnetization is not increased. That is, the effect of increasing the magnetic anisotropy and preventing demagnetization is fully displayed without detrimental sub-effects.

Moreover, if the anti-ferromagnetic recording layer and the ferromagnetic recording layer is layered together as in the present invention to improve the energy of magnetic anisotropy of the particles of the ferromagnetic material, it is possible to increase the magnetic anisotropy while characteristics such as the corrosion resistance or abrasion resistance on the surface of the magnetic recording medium remain as before.

The crystal grain size and magnetic anisotropy of the ferromagnetic recording layer which gives utmost results with the application of the present invention are hereinafter explained.

It is the thermal fluctuations of the recorded magnetization that detracts from the recording stability with the increase in the magnetic recording density. In consideration that contribution sufficient to surpass the energy of thermal fluctuations and that the film thickness of the recording layer for which the thermal fluctuations are not negligible is meaningless if such film thickness is not necessary industrially, the crystal grain size or magnetic anisotropy of the ferromagnetic material of the ferromagnetic recording layer which gives utmost results in application of the present invention are now explained in terms of numerical figures.

It is assumed that the ferromagnetic recording layer of the magnetic recording medium is constituted by columnar-shaped particles having a bottom surface of S [cm2] and a thickness of h [cm]. The energy which the magnetization of fine magnetic particles possesses by thermal fluctuations is of the order of the product of the Boltzmann constant k ($k=1.38\times10^{-16}$ [erg/K]) and the absolute temperature of the environment, or KT. That is, the energy which the magnetization of fine magnetic particles has by the thermal fluctuations is given by the following equation 6:

$$kT=1.38\times10^{-16}\,[erg/K]\times300\,[K]=4.44\times10^{-14}\,[erg] \quad (6).$$

It is assumed that the energy representing the intensity of exchange coupling between the anti-ferromagnetic layer and the ferromagnetic recording layer of the magnetic recording medium according to the present invention is J [erg/cm$^2$] per unit area. The above-mentioned particles of the magnetic material has its anisotropy of J×S [erg] supplemented via their bottoms. In order for the supplemented anisotropy to assist in stability in magnetization impaired by the thermal fluctuations, the supplemented anisotropy presumably should be of the order of J×S>(⅓) kT.

On the other hand, there is a limit to the magnitude of J obtained with the practicably usable material, which is usually less than 0.35 [erg/cm$^2$] (J<0.35 [erg/cm2]).

From the above, it follows that, in order for the present invention to have the effect of controlling the thermal fluctuations, the following equation (7) needs to be met:

$$1.4\times10^{-14}\,[erg]<J\times S<0.35\,[erg/cm^2]\times S\,cm^2 \quad (7)$$

it being assumed that (⅓)kT=$1.4\times10^{-14}$ erg.

That is, no sufficient operation from the particle bottom side can be afforded unless the relation S>$4\times10^{-14}$ cm$^2$ is met and the particle size is 2.3 nm or larger.

It is then considered whether or not the problem of thermal fluctuations occurs in the particles of the ferromagnetic material having this bottom surface. If, with the uniaxial magnetic anisotropy of the particles of the ferromagnetic material of Ku [erg/cm$^3$], the total energy of magnetic anisotropy per grain Ku [erg/cr$^3$]×(S×h) [cm$^3$] is less than the value of the thermal energy shown by the equation 6, in other words, is as shown by the following equation (8):

$$Ku[erg/cm^3]\times(S\times h)[cm^3]<kT=4.14\times10^{-14}\,[erg] \quad (8)$$

magnetization instability due to thermal fluctuations becomes significant such that application of the present invention is desirable.

If S>$4\times10^{-14}$ cm$^2$ is taken into consideration, the following equation (9):

$$Ku[erg/cm^3]\times h\,[cm]<1\,[erg/cm^2] \quad (9).$$

It is noted that, while the material for forming the ferromagnetic recording layer of, for example, Co—Cr—Pt alloy has the anisotropy as large as Ku~$10^6$ [erg/cm$^3$], the particle itself is affected by thermal fluctuations, if the thickness is such that h<$10^{-6}$ [cm]=10 nm, as may be seen from the equation 9.

Meanwhile, if, in the magnetic recording medium according to the present invention, the particles of the ferromagnetic material of 2.3 nm in diameter, necessary for realization, are charged into recording bit cells (area: 1.6×$10^4$ mn$^2$) of 20 [Gbit/in$^2$], as many as 3000 particles are contained per bit cell, such that the statistic noise of the magnetic recording medium can be reduced sufficiently. That is, there is no risk of the lower limit of the particle size of the ferromagnetic recording material suitable for application of the present invention impairing the S/N ratio.

The material used in the anti-ferromagnetic material of the magnetic recording medium embodying the present invention is explained in further detail.

The magnetic recording medium according to the present invention is such a magnetic recording medium in which the ferromagnetic material that is able to exchange the information via a magnetic field between it and the magnetic head is layered with an anti-ferromagnetic material which, while having a magnetic order in the interior, does not produce magnetic fields nor magnetic field in the space, while not receiving torque from the magnetic field.

As the material of the anti-ferromagnetic material of the present magnetic recording medium, a wide variety of substances, such as any suitable alloys, oxides or fluorides, may be used, if the materials used exhibit anti-ferromagnetic order at a temperature exceeding the operating temperature of the magnetic recording device.

Specifically, a wide variety of Mn-containing anti-ferromagnetic alloys are suitable. Mn shows not only anti-ferromagnetic properties as a sole γ-phase material but also anti-ferromagnetic properties in a wide composition range as an alloy with 3$d$ transition metals and noble metals. In particular, optimum characteristics are obtained with the Mn composition of not less than 40 at %.

Examples of the anti-ferromagnetic material of fluorides include FeF$_2$, MnF$_2$ and K$_2$NiF$_4$. Although certain substances lose anti-ferromagnetic order at lower than the ambient temperature, such substance can be utilized if in combination with different materials the anti-ferromagnetic properties of which are retained up to an elevated temperature.

According to the present invention, ferri-magnetic materials having a composition close to the compensation composition can be utilized as a material having properties analogous with those of the anti-ferromagnetic material (small magnetization and high magnetic anisotropy). For example, rare earth element-transition metal alloy, such as Tb—Co alloy, can be used.

Among the properties required of the recording medium in general, there is insusceptibility to corrosion during use or storage. The materials for the magnetic recording medium of the present invention are also desirably selected in this line.

In general, oxide anti-ferromagnetic material is superior in corrosion resistance in comparison with metals. Therefore, the anti-ferromagnetic layer of the magnetic recording medium according to the present invention is preferably an oxide anti-ferromagnetic material in view of corrosion resistance.

Among the oxides showing an anti-ferromagnetic order in a temperature range not lower than the ambient temperature of the magnetic recording medium is NiO. Also, α-Fe$_2$O$_3$ and Cr$_2$O$_3$ exhibit anti-ferromagnetic properties at ambient temperature. If, with NiO as a main component, another material is added to provide a solid solution, it is possible to adjust characteristics. If a solid solution of NiO and CoO is prepared, it is possible to prepare a material having higher magnetic anisotropy at ambient temperature than NiO can be prepared. It is noted that the Neel temperatures, above which the anti-ferromagnetic order is lost, of NiO and CoO, are near 548 K and 93 K(lower than ambient temperature), respectively, and that magnetic anisotropy of CoO is higher than that of NiO. Moreover, an anti-ferromagnetic material, obtained on layering NiO and CoO, can be used for the same purpose.

An alloy of metal with a noble metal sometimes improves corrosion resistance. Specifically, alloys of noble metals, such as Ir—Mn based alloys, P—Mn based alloys, Pd—Pt—

Mn based alloys or Rh—Cr—Mn based alloys, are superior in corrosion resistance, and may be used with advantage as a material for an anti-ferromagnetic layer of the magnetic recording medium according to the present invention.

Meanwhile, thermal stability of a magnetic recording medium is to be improved in the present invention. It is therefore desirable for the anti-ferromagnetic material to maintain an anti-ferromagnetic magnetic order to maintain the coupling with the magnetization of the ferromagnetic material not only at ambient temperature but also at elevated temperature environment. In particular, if attention is directed to a region in the magnetic recording device in which the recording medium faces the magnetic head, there is a possibility that the local temperature exceedingly higher than the ambient temperature occurs on the recording medium due to friction by head contact or electrical discharge of static electricity due to electrification. For nevertheless holding the recording, an anti-ferromagnetic material with high thermal resistance is required.

The critical temperature above which the anti-ferromagnetic material loses the anti-ferromagnetic order is termed the Neel temperature. The upper limit of the temperature at which the force of restraint can be demonstrated against magnetization of the ferromagnetic material in contact therewith is termed the blocking temperature.

From the standpoint of thermal stability, the anti-ferromagnetic material with high blocking temperature is desirable if it is to be used in the present invention. Specifically, the blocking temperature is desirably higher than the maximum local temperature of the anti-ferromagnetic layer that may be encountered during recording/reproduction.

The blocking temperature is usually significantly lower than the Neel temperature. It is noted that the higher the Neel temperature of a material, the higher is its blocking temperature. The materials known to exhibit higher blocking temperature are shown in the following table:

| names of materials | blocking temperature [° C.] | Neel temperature [° C.] | T anneal [° C.] |
|---|---|---|---|
| Ni—Mn | 450 | 797 | 280 |
| Pt—Mn | 380 | 702 | 280 |
| Pt—Cr—Mn | 380 | | |
| Pd—Pt—Mn | 300 | | 230 |

Meanwhile, these materials having higher blocking temperatures mostly exhibit anti-ferromagnetic properties by the constituent elements of the material being regularly arrayed to constitute regular crystals, such that regularization is not produced unless heat treatment is performed at higher than a pre-set temperature. In the above table, the heat treatment temperature necessary to induce this regularization is indicated as T anneal. If T anneal is too, high, manufacture constraints are occasionally induced. However, if the processing temperature not higher than 300° C. suffices, the regularization can be induced at a temperature of substrate heating routinely achieved during deposition of the thin film when producing the recording medium, so that no significant impediments are produced.

On the other hand, such a material which gives rise to anti-ferromagnetic properties with a disordered alloy, that is the material exhibiting anti-ferromagnetic properties with a non-regular array of the constituent elements, is not in need of heat treatment at elevated temperature, while an anti-ferromagnetic thin film can be easily produced solely by the thin-film forming technique by the thin film forming technique, such as sputtering, thus assuring superior productivity. Examples of the anti-ferromagnetic materials include Fe—Mn alloys, Ir—Mn based alloys, Rh—Mn based alloys, Pt—Cr—Mn based alloys and Cr—Al alloys.

EXAMPLES

For confirming the meritorious effect of the present invention, magnetic recording mediums were actually produced and the coercivity thereof were checked. The results are hereinafter explained.

For preparing the magnetic recording medium, a hard disc of Mg-containing aluminum, 2.5 cm in diameter and 10 mm in thickness, having a Ni—P plated coating layer formed thereon, was prepared as a substrate.

Then, using a first cathode of a four-source magnetron sputtering device, having four cathodes and on which four targets can be arrayed, a Cr target was arrayed, and a Cr underlying layer was formed to a thickness of 3 nm on the plating coating layer of the substrate. The degree of vacuum prior to start of sputtering was $2\times10^{-7}$ Torr.

Then, a disc of $Ni_{50}Mn_{50}$ alloy having a diameter of 100 mm and a thickness of 5 mm was arrayed as a target on the second cathode of the same sputtering device and the substrate carrying the Cr underlying layer was moved thereon. As high-purity argon was introduced at a rate of 20 SCCM, sputtering was started at a dc closing power of 300 W in argon of $2\times10^{-3}$ Torr, by adjusting a vent-side valve to form an anti-ferromagnetic layer. During the first 30 minutes, electrical discharging was carried out, as the shutter remained closed, in order to perform sputtering for cleaning and stabilizing the target surface without deposition on the substrate. The shutter was then opened to permit deposition on the substrate for 18 seconds. The film thickness as found from the calibrated deposition rate was 15 nm. Analyses of the composition of the deposited thin film revealed that the material was $Ni_{49}Mn_{51}$ alloy offset 1% to the Mn surplus side from the target composition.

A Co target was placed on the third cathode of the sputtering device and Co was deposited to a thickness corresponding to two atom layers by dc magnetron sputtering to form a coupling control layer which assists in exchange coupling between the anti-ferromagnetic layer and the ferromagnetic recording layer as later explained. The electrical discharge for cleaning the target prior to this deposition was carried out simultaneously with the cleaning of the target arrayed on the second cathode. The Co layer was formed immediately after formation of the anti-ferromagnetic layer.

On the fourth cathode of the sputtering device was then arrayed a Co—Cr—Pt alloy target and a substrate carrying respective layers was moved thereon. As high-purity argon was supplied at a rate of 20 SCCM, sputtering was started at a dc closing power of 300 W in argon of $2\times10^{-3}$ Torr, by adjusting a vent-side valve to form an anti-ferromagnetic layer. During the first 30 minutes, electrical discharging was carried out, as the shutter remained closed, in order to perform sputtering for cleaning and stabilizing the target surface without deposition on the substrate. The shutter was then opened to permit deposition on the. substrate for 14 seconds to form a Co—Cr—Pt alloy thin film of a film thickness of 6 nm as a ferromagnetic recording layer to complete the magnetic recording medium. This magnetic recording medium is termed a sample 1 for convenience.

The magnetic properties of the sample 1, thus prepared, were measured by a vibrating sample magnetometer (VSM) of the sample 1 to prepare a magnetization curve at ambient temperature. It was found that coercivity was 3100 Oe.

Plural samples of the magnetic recording medium were prepared, by varying the sorts and thicknesses of the anti-ferromagnetic layer, and measurement was made of the coercivity of the magnetic recording medium. A magnetic recording medium configured similarly to the sample 1 except using a thin alloy film of $Rh_{19}Mn_{81}$. with a thickness of 3 nm as the anti-ferromagnetic layer was prepared and termed a sample 2. Also, a magnetic recording medium configured similarly to the sample 1 except using a thin alloy film of $Cr_{47}Mn_{47}Pt_6$ with a thickness of 20 nm as the anti-ferromagnetic layer was prepared and termed a sample 3. Likewise, a magnetic recording medium configured similarly to the sample 1 except using a thin alloy film of NiO with a thickness of 20 nm as the anti-ferromagnetic layer was prepared and termed a sample 4.

For comparison sake, a magnetic recording medium not carrying the anti-ferromagnetic layer was prepared to check into the coercivity of the magnetic recording medium. A magnetic recording medium configured similarly to the sample 1 except changing the thickness of the ferromagnetic metal recording film of the Co—Cr—Pt alloy to 15 mn and not forming the anti-ferromagnetic layer was prepared. This magnetic recording medium was termed a sample 5. A magnetic recording medium configured similarly to the sample 1 except changing the thickness of the ferromagnetic metal recording film of the Co—Cr—Pt alloy to 6 nm and not forming the anti-ferromagnetic layer was prepared. This magnetic recording medium was termed a sample 6.

The coercivity of the samples 2 to 4 were checked as in the case of the sample 1. The coercivities of the samples 2 to 4 were found to be 2250 Oe, 1910 Oe and 2300 Oe, respectively.

Similarly, the coercivity of the samples 5 and 6 were checked as in the case of the sample 1. The coercivities of the samples 5 and 6 were found to be 2430 Oe and 1520 Oe, respectively.

Of the above samples, the sample 5, prepared for comparison sake, was of a thickness sufficient to permit the thermal fluctuations to be safely neglected. With this sample, a high coercivity was secured.

In the sample 6, prepared for comparison, the ferromagnetic recording layer was of a reduced film thickness such that the coercivity was lowered significantly in comparison with the thermal fluctuations. Conversely, in the samples 1 to 4 carrying the anti-ferromagnetic layer, the coercivity was significantly improved, such that the coercivity of substantially the same order of magnitude as that of the sample 5 not susceptible to thermal fluctuations was obtained.

Also, a sample 7, comprised of the ferromagnetic recording layer of the sample 2 carrying a NiO thin film of a thickness of 8 nm as a protective layer, was formed and the coercivity thereof was measured as in the above samples. The coercivity of the sample 7 was found to be 2600 Oe. Since this NiO thin film is also the anti-ferromagnetic layer as described above, the ferromagnetic recording layer is sandwiched in this sample 7 by the anti-ferromagnetic layers. With this configuration, the coercivity was improved significantly such that the coercivity of the same order of magnitude as the sample 5 not susceptible to thermal fluctuations was obtained.

Thus, if the anti-ferromagnetic. layer is layered on at least one of the major surfaces of the ferromagnetic recording layer along its thickness, according to the present invention, the anti-ferromagnetic layer operates as a pinning layer, such that, while the demand for reduced thickness of the ferromagnetic recording layer and the small size of the crystal grains of the ferromagnetic material is met, a high energy of magnetic anisotropy of the particles. of the ferromagnetic material and improved coercivity are realized to cope with higher recording density expected in near future.

What is claimed is:

1. A magnetic recording medium having a ferromagnetic layer on a substrate, wherein:

an anti-ferromagnetic layer is layered on at least one of the opposite major surfaces of said ferromagnetic recording layer along the direction of thickness thereof, the anti-ferromagnetic layer having an anti-ferromagnetic domain structure of plural anti-ferromagnetic domains lying in a vicinity of a facing surface to the ferromagnetic layer that is coincident with the magnetic domain structure of the ferromagnetic layer; and magnetization of the vicinity of a facing surface of said anti-ferromagnetic layer to said ferromagnetic recording layer is rotated with magnetization of the ferromagnetic recording layer at the time of inversion of magnetization of said ferromagnetic recording layer by an external magnetic field.

2. A magnetic recording medium having a ferromagnetic layer on a substrate, wherein:

an anti-ferromagnetic layer is layered on at least one of the opposite major surfaces of said ferromagnetic recording layer along the direction of thickness thereof; and the intensity of the exchange coupling between the ferromagnetic recording layer and the anti-ferromagnetic layer is larger than the total magnetic anisotropy of said anti-ferromagnetic layer.

3. A magnetic recording medium having a ferromagnetic layer on a substrate, wherein:

an anti-ferromagnetic layer is layered on at least one of the opposite major surfaces of said ferromagnetic recording layer along the direction of thickness thereof;

the intensity of the exchange coupling between the ferromagnetic recording layer and the anti-ferromagnetic layer is smaller than the total magnetic anisotropy of said anti-ferromagnetic layer; and the intensity of the exchange coupling between the ferromagnetic recording layer and the anti-ferromagnetic layer is larger than the magnetic domain energy of said anti-ferromagnetic layer.

4. The magnetic recording medium according to claim 3 wherein the exchange constant on an interface between the ferromagnetic recording layer and the anti-ferromagnetic layer is not less than $1 \times 10^{-12}$ [erg/cm].

5. The magnetic recording medium according to claim 3 wherein the ferrmagnetic recording layer has magnetic propetties with an atisotropic magnetic field not large than 100 Oe and a film thickness of not larger than 100 nm.

6. The magnetic recording medium according to claim 3 wherein the ferromagnetic recording layer has magnetic properties with a coercivity of not less than 100 Oe and a film thickness of not larger than 100 nm.

7. The magnetic recording medium according to claim 3 wherein said anti-ferromagnetic layer has an exchange constant of $1 \times 10^{-10}$ erg/cm and a energy of magnetic anisotropy of not less than $1 \times 10^3$ erg/cm$^3$ and wherein magnetic moments are ferromagnetically arrayed on a facing side of said anti-ferromagnetic layer to said ferromagnetic recording layer.

8. The magnetic recording medium according to claim 3 wherein said anti-ferromagnetic layer has an exchange constant of $1\times10^{-9}$ erg/cm and a energy of magnetic anisotropy of not less than $1\times10^4$ erg/cm$^3$ and wherein magnetic moments are anti-ferromagnetically arrayed on a facing side of said anti-ferromagnetic layer to said ferromagnetic recording layer.

9. A magnetic recording medium having a ferromagnetic layer on a substrate, wherein:

an anti-ferromagnetic layer is layered on at least one of the opposite major surfaces of said ferromagnetic recording layer along the direction of thickness thereof;

said anti-ferromagnetic layer includes a first region rotated with magnetization of said ferromagnetic recording layer, at the time of inversion of magnetization of the ferromagnetic recording layer by an external magnetic field on the facing side to the ferromagnetic recording layer, in keeping with magnetization of said ferromagnetic recording layer; and a second region not rotated with magnetization of said ferromagnetic recording layer at the time of inversion of magnetization of said ferromagnetic recording layer by the external magnetic field, said first region being broader than said second region.

10. The magnetic recording medium according to claim 9 wherein an intermediate layer comprised of Fe or Co is interposed between said ferromagnetic recording layer and the anti-ferromagnetic layer.

11. The magnetic recording medium according to claim 1 wherein said anti-ferromagnetic layer is composed of an oxide or an alloy of noble metals exhibiting anti-ferromagnetic properties.

12. The magnetic recording medium according to claim 1 wherein said anti-ferromagnetic layer has a blocking temperature higher than the maximum temperature of the anti-ferromagnetic layer that may be locally produced during recording/reproduction, said blocking temperature representing an upper limit of the temperature at which the anti-ferromagnetic layer can display the force of restraint against magnetization of the ferromagnetic material with which the anti-ferromagnetic layer is contacted.

13. The magnetic recording medium according to claim 1 wherein said anti-ferromagnetic layer is formed of a material exhibiting anti-ferromagnetic properties in a state in which constituent elements are not arrayed regularly.

14. The magnetic recording medium according to claim 2 wherein said anti-ferromagnetic layer is composed of an oxide or an alloy of noble metals exhibiting anti-ferromagnetic properties.

15. The magnetic recording medium according to claim 2 wherein said anti-ferromagnetic layer has a blocking temperature higher than the maximum temperature of the anti-ferromagnetic layer that may be locally produced during recording/reproduction, said blocking temperature representing an upper limit of the temperature at which the anti-ferromagnetic layer can display the force of restraint against magnetization of the ferromagnetic material with which the anti-ferromagnetic layer is contacted.

16. The magnetic recording medium according to claim 2 wherein said anti-ferromagnetic layer is formed of a material exhibiting anti-ferromagnetic properties in a state in which constituent elements are not arrayed regularly.

17. The magnetic recording medium according to claim 3 wherein said anti-ferromagnetic layer is composed of an oxide or an alloy of noble metals exhibiting anti-ferromagnetic properties.

18. The magnetic recording medium according to claim 3 wherein said anti-ferromagnetic layer has a blocking temperature higher than the maximum temperature of the anti-ferromagnetic layer that may be locally produced during recording/reproduction, said blocking temperature representing an upper limit of the temperature at which the anti-ferromagnetic layer can display the force of restraint against magnetization of the ferromagnetic material with which the anti-ferromagnetic layer is contacted.

19. The magnetic recording medium according to claim 3 wherein said anti-ferromagnetic layer is formed of a material exhibiting anti-ferromagnetic properties in a state in which constituent elements are not arrayed regularly.

20. The magnetic recording medium according to claim 9 wherein said anti-ferromagnetic layer is composed of an oxide or an alloy of noble metals exhibiting anti-ferromagnetic properties.

21. The magnetic recording medium according to claim 9 wherein said anti-ferromagnetic layer has a blocking temperature higher than the maximum temperature of the anti-ferromagnetic layer that may be locally produced during recording/reproduction, said blocking temperature representing an upper limit of the temperature at which the anti-ferromagnetic layer can display the force of restraint against magnetization of the ferromagnetic material with which the anti-ferromagnetic layer is contacted.

22. The magnetic recording medium according to claim 9 wherein said anti-ferromagnetic layer is formed of a material exhibiting anti-ferromagnetic properties in a state in which constituent elements are not arrayed regularly.

\* \* \* \* \*